July 29, 1930.  W. E. McCULLOUGH  1,771,856
STRUCTURAL JOINT
Filed July 16, 1928
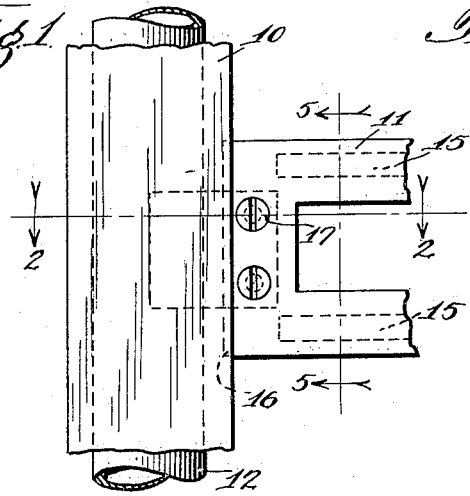
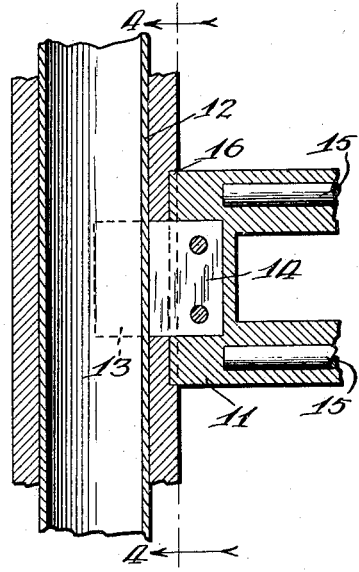
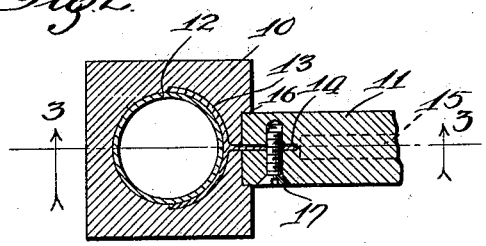
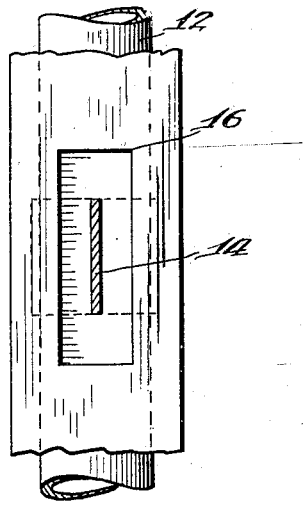
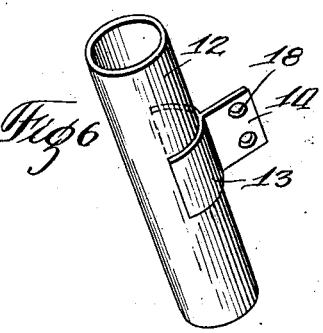
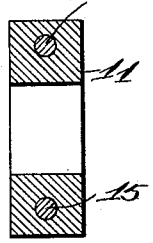
Inventor:
William E. McCullough
By Jones, Addington, Ames & Seibold
Attys.
Witness:

Patented July 29, 1930

1,771,856

UNITED STATES PATENT OFFICE

WILLIAM E. McCULLOUGH, OF KENOSHA, WISCONSIN, ASSIGNOR TO SIMMONS COMPANY, OF KENOSHA, WISCONSIN, A CORPORATION OF DELAWARE

STRUCTURAL JOINT

Application filed July 16, 1928. Serial No. 293,035.

My invention relates to an improved construction for joining together two pieces of structural material, preferably of the kind which comprises a metal reinforcing within a molded covering.

One of the objects of my invention is to provide a strong rigid joint between two pieces of molded resinoid material having a central core of hollow metal or the like, and so to construct the joint that the same is invisible from the side of the object usually exposed to view.

As a specific embodiment of my invention I have chosen to illustrate the same in connection with a joint between the leg and cross support of a chair, although it is to be understood that the form of joint forming the subject-matter of my invention is not to be limited merely to such applications, but may be used wherever a joint of this type may be found applicable.

Essentially, the joint consists of a tube of metal having welded thereto a flange adhering to and forming part of the outer circumference of the tube and for a portion of its length extending in the direction of the diameter of the tube. This joint is produced either by riveting or welding, electrically or otherwise. The tube with the flange welded thereto thereupon is placed in a mold and is surrounded with a closely adhering layer of thermoplastic molded material in such a manner that only a portion of the aforesaid flange will be visible and will protrude laterally from the molded material.

Cooperating with the said flange there is a cross support, which may or may not be reinforced, but which, in either event, is provided with a slot in the end thereof of such size and configuration as to register with the protruding flange. One or more threaded openings are provided in the flange and the cross support is drilled laterally so as to provide holes registering with the said threaded openings whereby screws may be employed to fasten the cross support rigidly onto the protruding portion of the flange, thereby producing the joint.

In order to enable my invention to be fully understood, I have illustrated the same in the drawings accompanying and forming a part of the present specification. In the drawings:

Figure 1 is a vertical elevation of the joint which forms the subject matter of my present invention;

Fig. 2 is a cross-section taken along the line 2—2 in Fig. 1;

Fig. 3 is a vertical cross-section taken along the line 3—3 in Fig. 2;

Fig. 4 is a side view, partly in section, taken along the line 4—4 of Fig. 3;

Fig. 5 is a cross-sectional side view, taken along the line 5—5 of Fig. 1; and

Fig. 6 is a perspective drawing showing the metal reinforcing with the thereonto attached flange.

Referring to the figures, in which similar numerals designate the same parts throughout, it will be seen that my joint is formed between two structural members 10 and 11 which consist, in the modification that I have chosen as an illustration of my invention, of a thermoplastic molded material, such, for example, as a phenol resinoid. The structural member consists of a central core 12 made of metallic tubing, for example, steel tubing, which, prior to the molding of the plastic material 10 thereabout, has welded to it at 13 a laterally extending metallic flange 14, this adhering to the tube 12 for a portion of its circumference.

In constructing the joint, the metallic tube 12 with the flange 14 welded thereto is placed in a mold in a hydraulic press and is surrounded with pulverulent thermoplastic molding powder which thereupon is molded under heat and pressure so that it will flow and then set into a rigid solid mass 10 adhering to and surrounding the metallic tube 12.

The mold is so designed that the part 14 of the flange will protrude laterally from the molded material 10, as most plainly seen in Figs. 1, 2 and 3. The part 11, which for example may be the grill of a chair, likewise consists of molded material, and may contain the reinforcing rods 15, as shown in Figs. 1, 2, 3 and 5. The end of the molded grill 11 is provided with a slot of sufficient size just to admit the flange 14. The molded part 10 is recessed slightly at 16 so as to admit the end of the part 11, as shown in Figs. 1, 2 and 3. When the part 11 is in position, as shown in Figs. 1, 2 and 3, the screws 17 are screwed into the threaded openings 18 with which the flange 14 is provided, as already indicated. This will form a rigid and strong connection between the cross support 11 and the part 10.

Specifically, I employ this joint in the production of a chair of molded material, in which chair the longitudinal and lateral stresses are borne substantially by the hollow metallic reinforcing core 12 and similar members, not shown herein.

Modifications of the construction, for example the use of a central core having the flange formed integral therewith or having the flange riveted thereto are to be considered as within the scope of my invention. Likewise, I wish it understood that it would also be an expedient to have the reinforcing members 15 extend through the end of the member 11 and to cooperate with the flange 14. Furthermore, I do not wish to be limited exclusively to the forming of this joint from parts that are made of molded material, as it is equally applicable to parts made of wood. In this case the member 10 would be split longitudinally and placed about the reinforcing member 12, the two halves being fastened together by a suitable adhesive, such as glue, cement, or the like.

The specific application of my invention and its practical utility are in the production of molded resinoid furniture. The present invention makes it possible to ship in knocked-down condition articles of furniture, such as chairs, tables, and the like, and rapidly assemble the same on moving assembly lines with great speed and accuracy, as the parts being molded in steel dies are all absolutely interchangeable and will register correctly with each other.

What I claim as my invention is:

1. A joint adapted to secure together parts of an article of furniture, such as a chair, comprising a metallic member and flange welded thereto, a mass of hardened molded material surrounding said member and partly surrounding said flange, said flange extending beyond the surface of said molded material, a molded resinoid cross support provided with a longitudinal slot at the end thereof, said slot being adapted to receive said flange, and means for fastening said cross support and flange to each other.

2. Means for assembling an article of furniture which comprises a molded furniture member, a metallic reinforcing member embedded therein, a flange fastened to said reinforcing member and extending to the outside of the structural furniture member, a molded resinoid cross support provided with a slot adapted to engage said flange, and means for fastening said flange and cross support to each other.

3. Means for assembling an article of furniture which comprises a molded resinoid furniture member, a metallic reinforcing member imbedded therein, a flange fastened to said reinforcing member extending beyond the surface of said molded member, said molded member being provided with a recess, a molded resinoid cross-support provided with a slot adapted to engage said flange, and means for fastening said flange and cross-support to each other, the end of said cross-support being fitted into said recess.

4. Means for joining together the leg and cross-support of a chair which comprises a molded resinoid chair leg, a metallic tube imbedded in said leg, a flange attached to said tube and extending laterally thereof and through said leg extending from the same, a molded resinoid cross-support provided with a slot at its end and thereby engaging said flange, screws fastening together said flange and cross-support, and a recess in said leg into which recess the end of said cross-support is fitted.

In witness whereof, I have hereunto subscribed my name.

WILLIAM E. McCULLOUGH.